(12) United States Patent
Maheshwary et al.

(10) Patent No.: US 8,545,603 B2
(45) Date of Patent: Oct. 1, 2013

(54) METHOD TO IMPROVE RECOVERY AND EFFICIENCY OF ADSORPTION PROCESSES USING REVERSIBLE BLOWERS

(75) Inventors: Apurva Maheshwary, Edison, NJ (US); John Robert Ambriano, Hockessin, DE (US); James J Flaherty, Hampton, NJ (US); Krishnamurti V Subramanian, Bridgewater, NJ (US)

(73) Assignee: Adsorptech Inc., Bridgewater, NJ (US)

( * ) Notice: Subject to any disclaimer, the term of this patent is extended or adjusted under 35 U.S.C. 154(b) by 206 days.

(21) Appl. No.: 12/822,467

(22) Filed: Jun. 24, 2010

(65) Prior Publication Data

US 2011/0315009 A1    Dec. 29, 2011

(51) Int. Cl.
*B01D 53/047* (2006.01)
(52) U.S. Cl.
USPC ................... 95/96; 95/102; 96/115

(58) Field of Classification Search
USPC .............. 96/115, 121; 95/95–98, 102, 104, 95/105, 130
See application file for complete search history.

(56) References Cited

U.S. PATENT DOCUMENTS

| | | | | |
|---|---|---|---|---|
| 4,228,197 A | * | 10/1980 | Means | 426/419 |
| 5,122,164 A | * | 6/1992 | Hirooka et al. | 95/26 |
| 5,679,134 A | * | 10/1997 | Brugerolle et al. | 95/96 |
| 5,906,674 A | * | 5/1999 | Tan et al. | 95/98 |
| 5,968,236 A | * | 10/1999 | Bassine | 96/130 |
| 6,048,384 A | * | 4/2000 | Smolarek | 95/98 |
| 7,114,932 B1 | * | 10/2006 | Bassine | 418/268 |
| 2010/0095841 A1 | * | 4/2010 | Naheiri | 95/26 |

* cited by examiner

*Primary Examiner* — Frank Lawrence, Jr.
(74) *Attorney, Agent, or Firm* — Adsorptech Inc.

(57) ABSTRACT

The present invention provides for a method utilizing adsorber bed(s) and reversible blower(s) operating in a vacuum pressure swing adsorption separation process to separate gases. The process is designed to provide a safer and more cost-effective adsorption system that captures and utilizes energy typically wasted during equipment transitions thereby achieving overall higher power efficiency.

10 Claims, 18 Drawing Sheets

PROCESS VARIATION WITH DUAL MOTORS

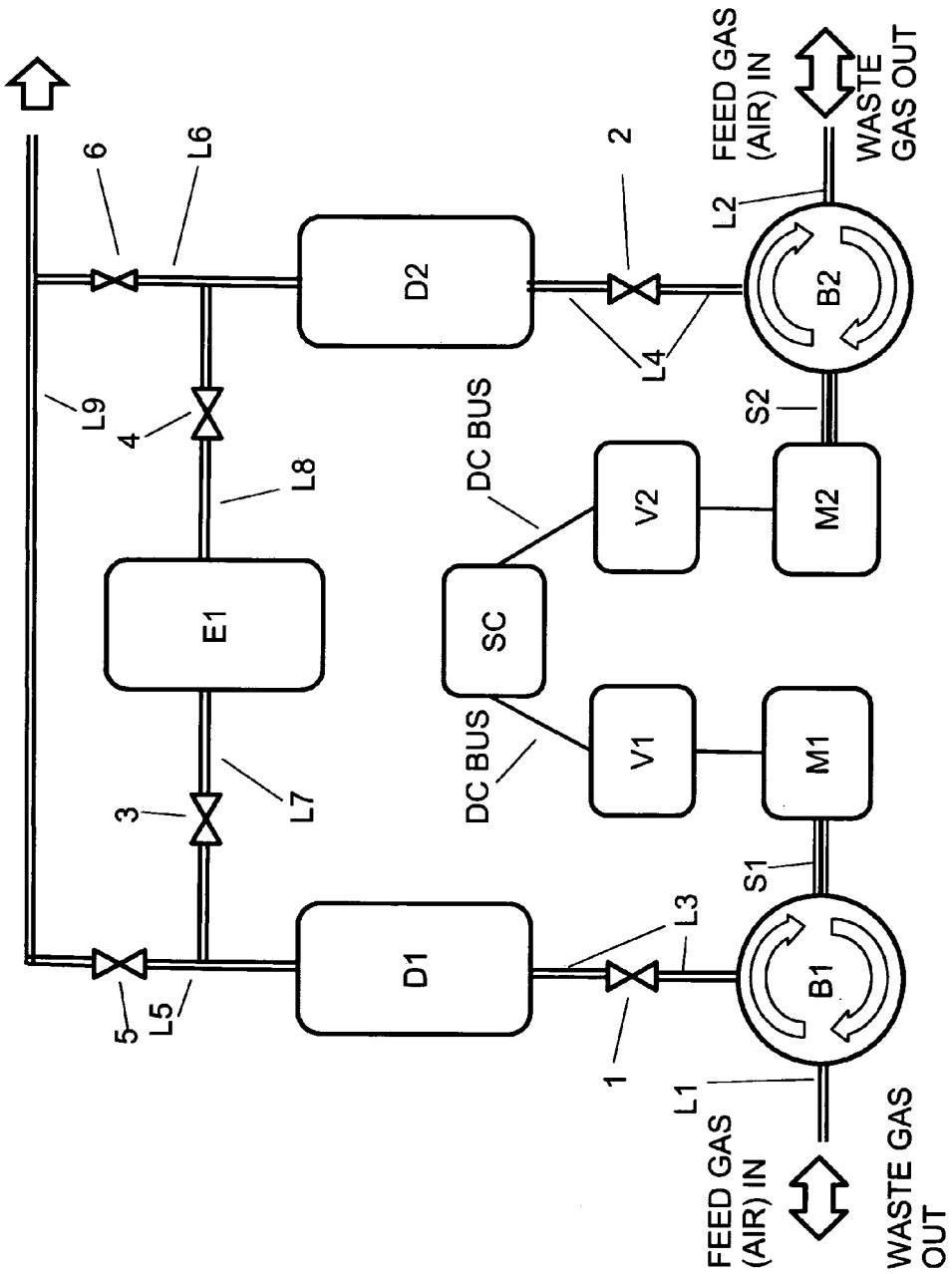
FIG. 1 PROCESS VARIATION WITH DUAL MOTORS

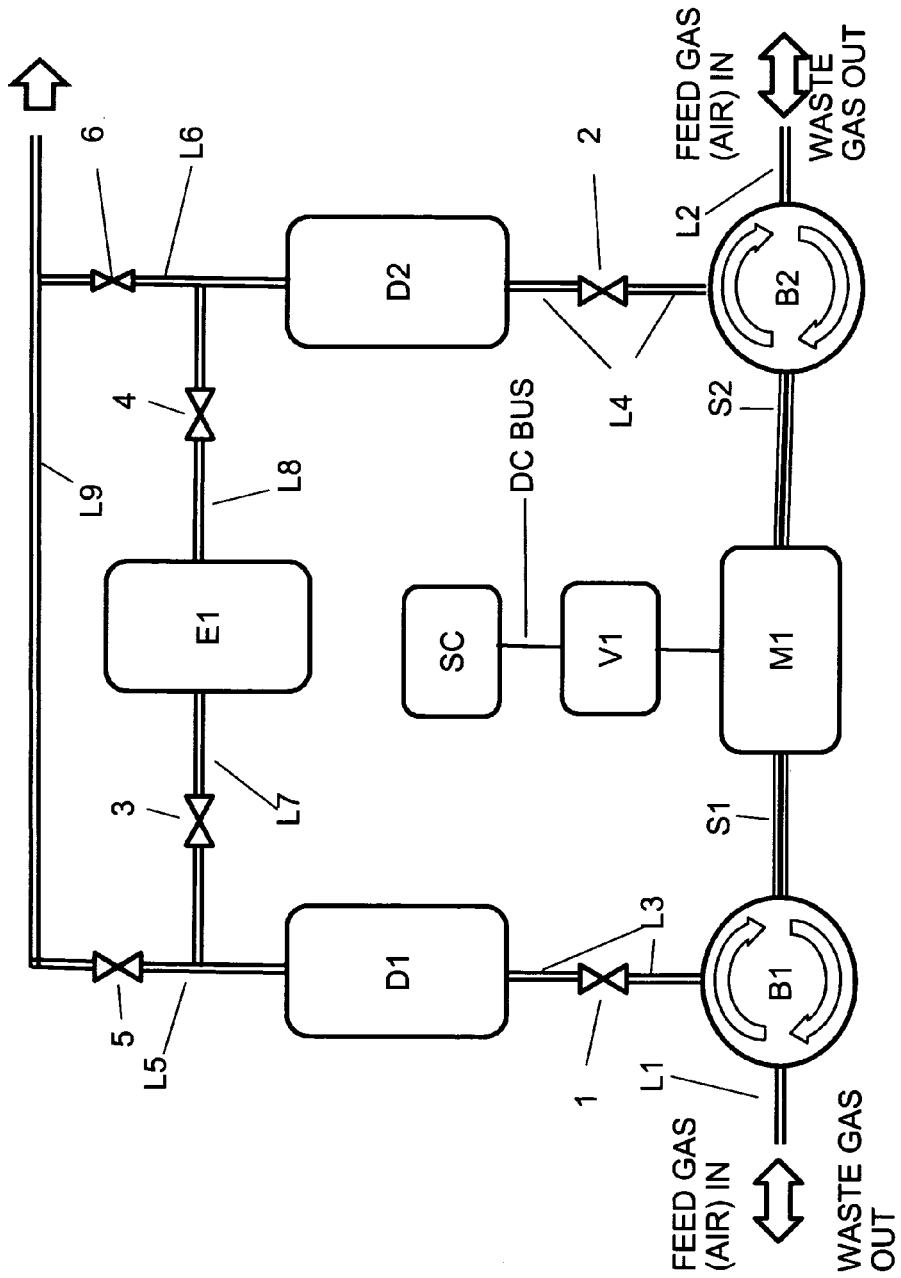
FIG. 2 PROCESS VARIATION WITH SINGLE MOTOR

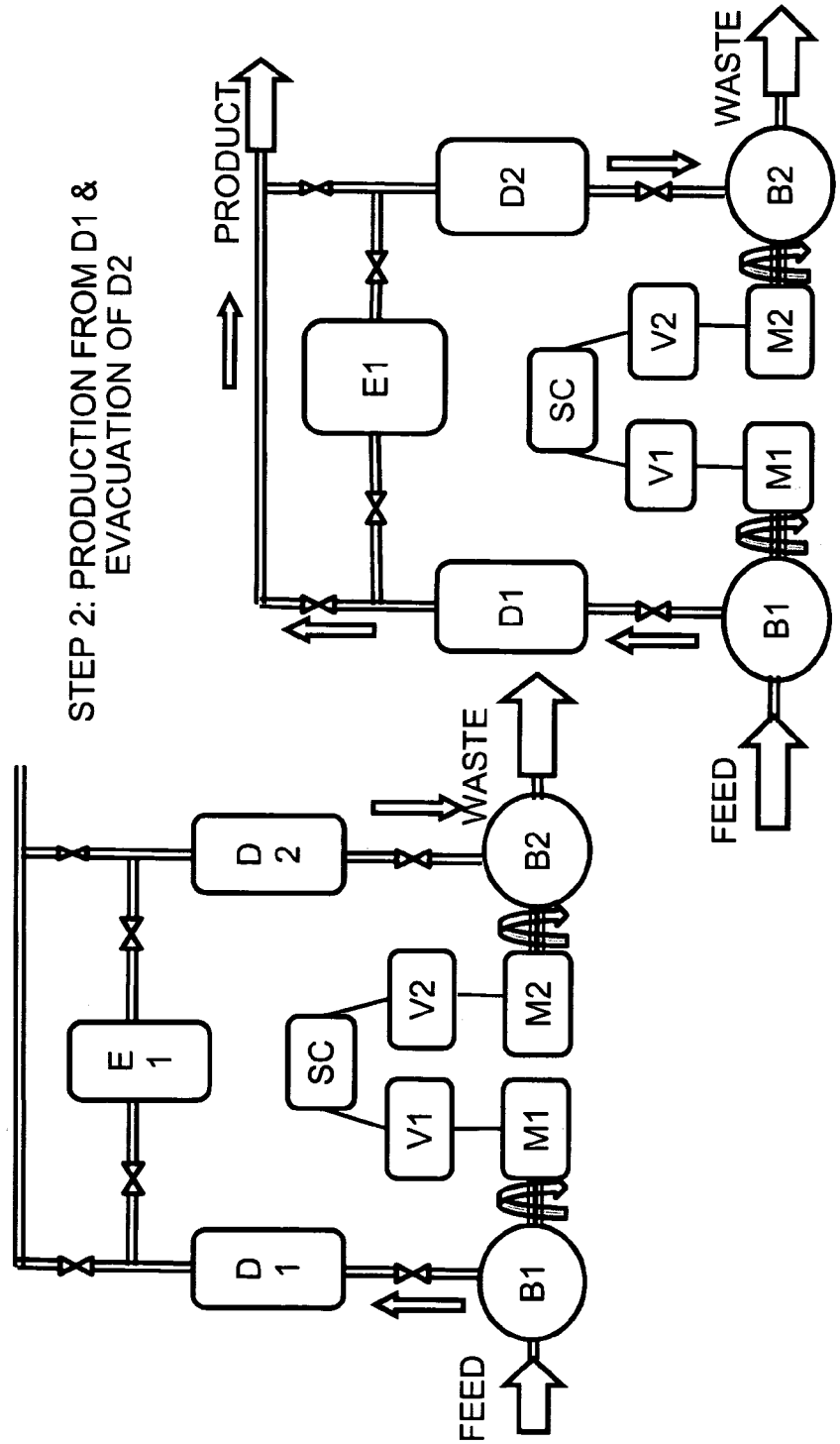

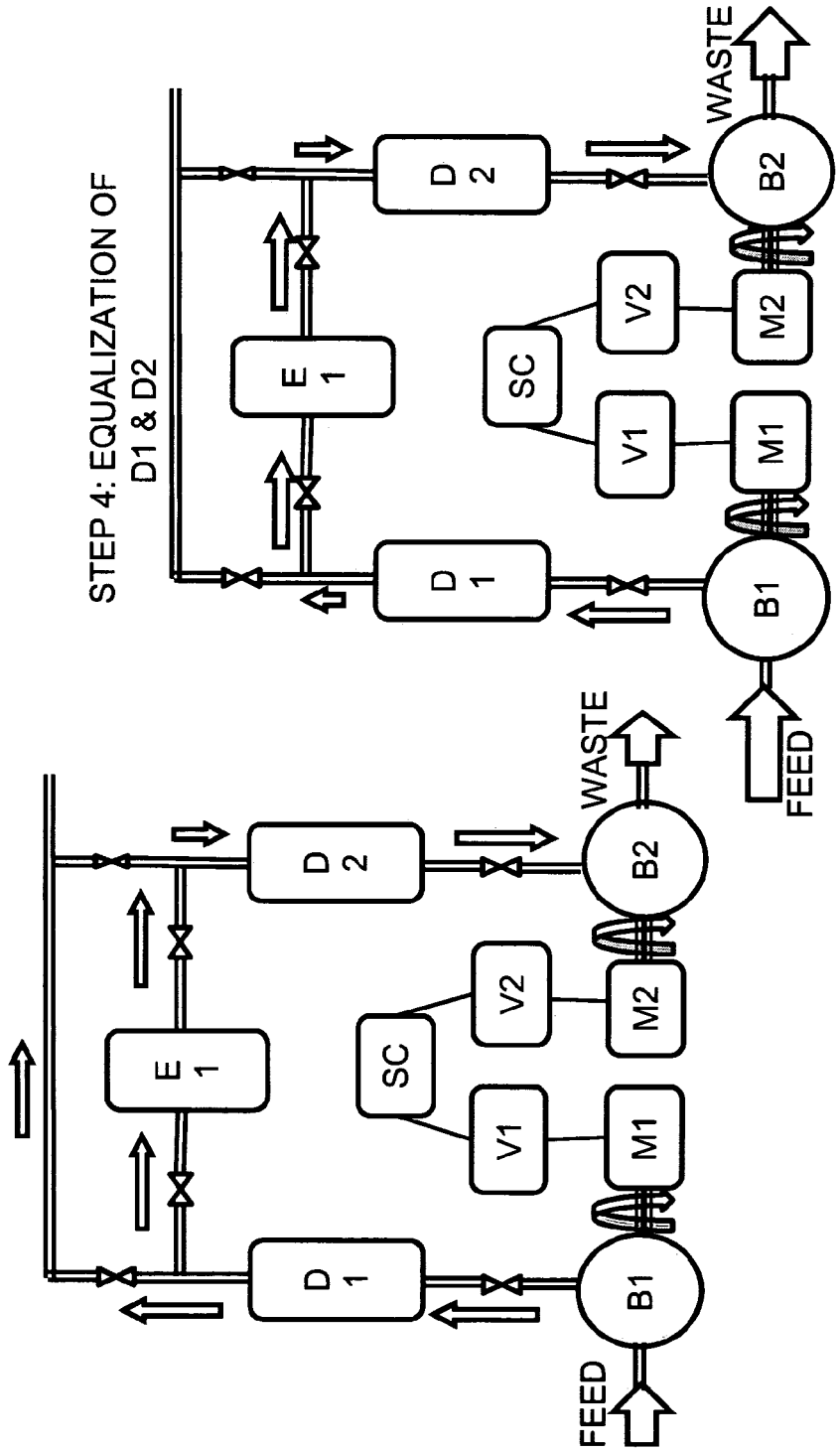

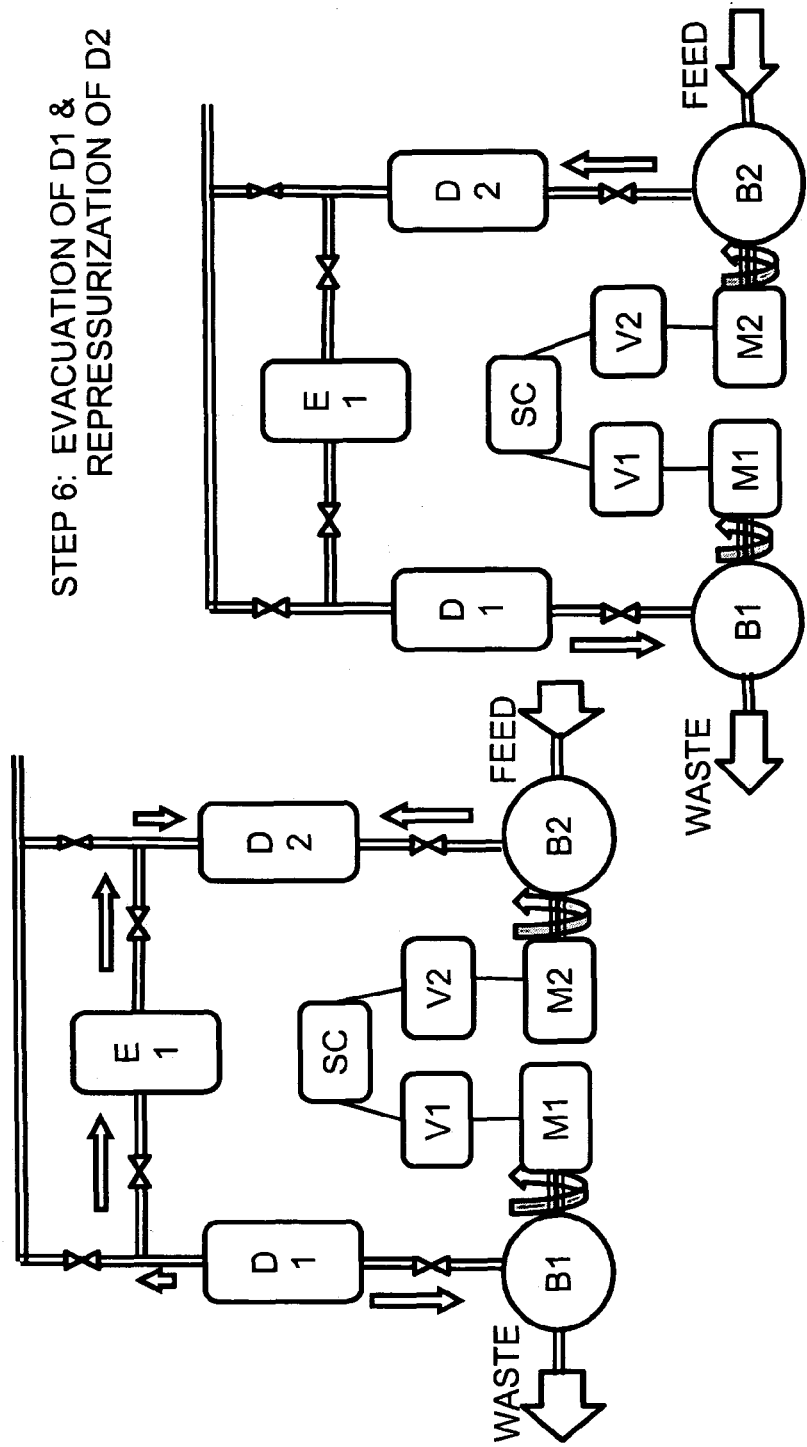

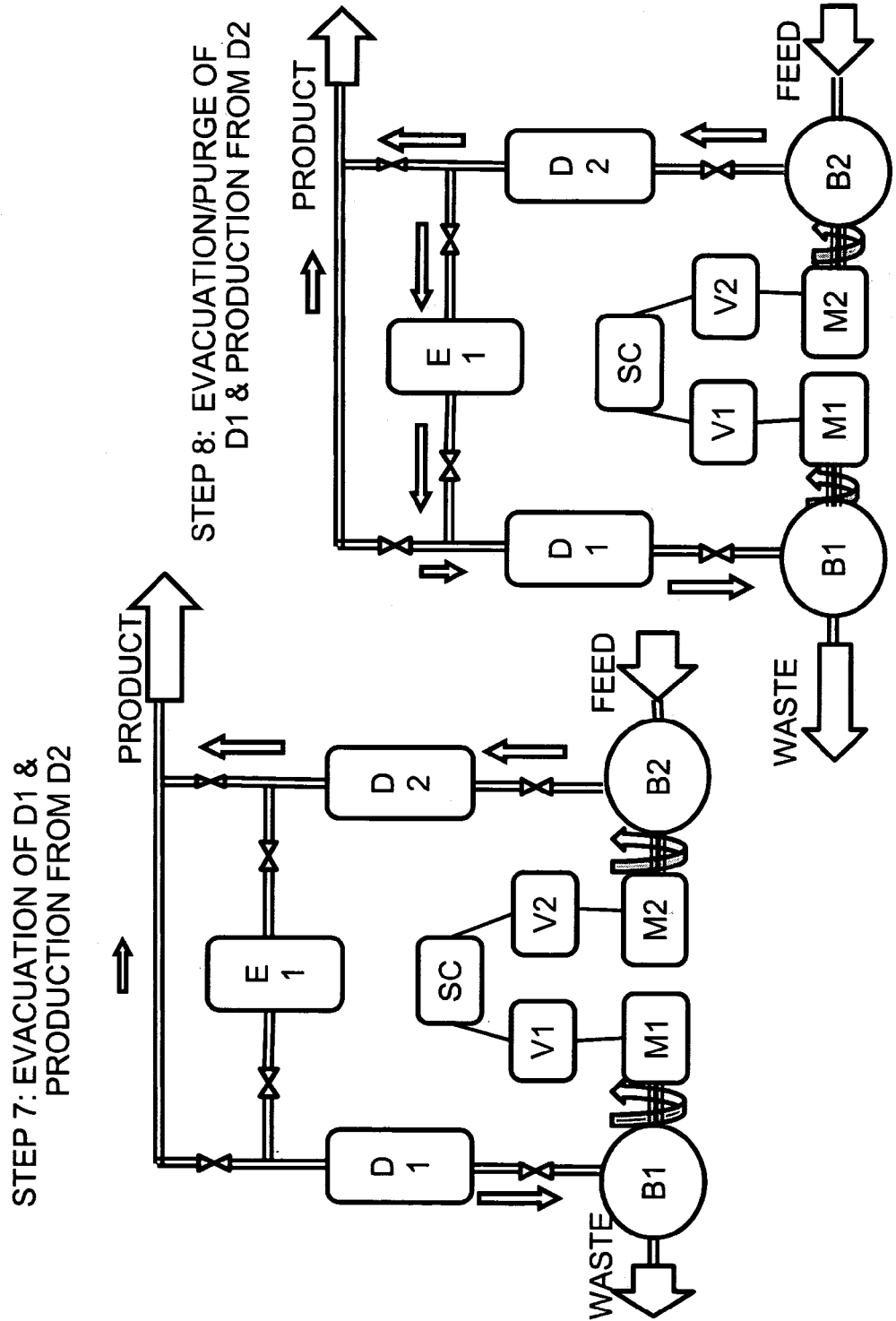

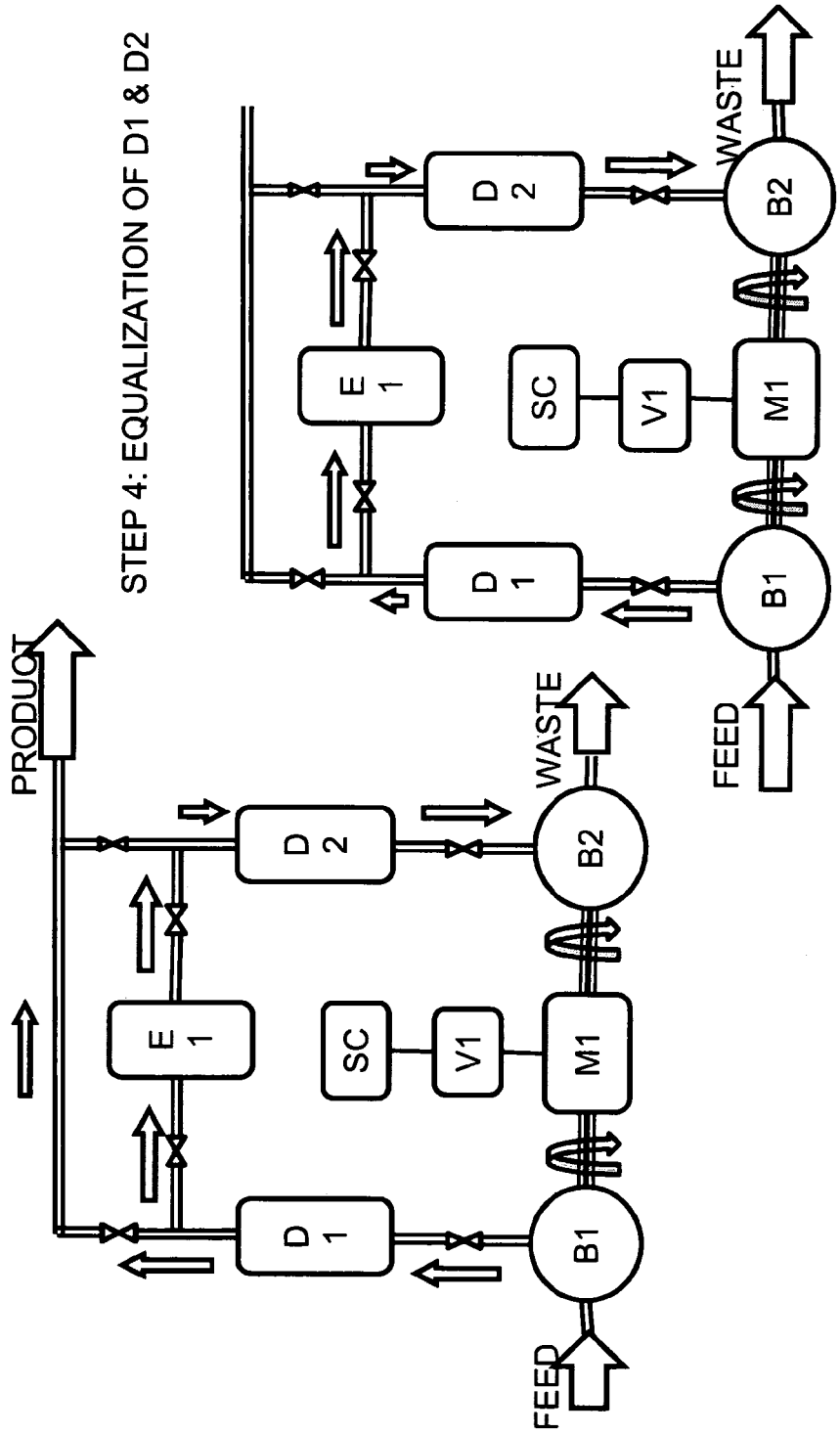

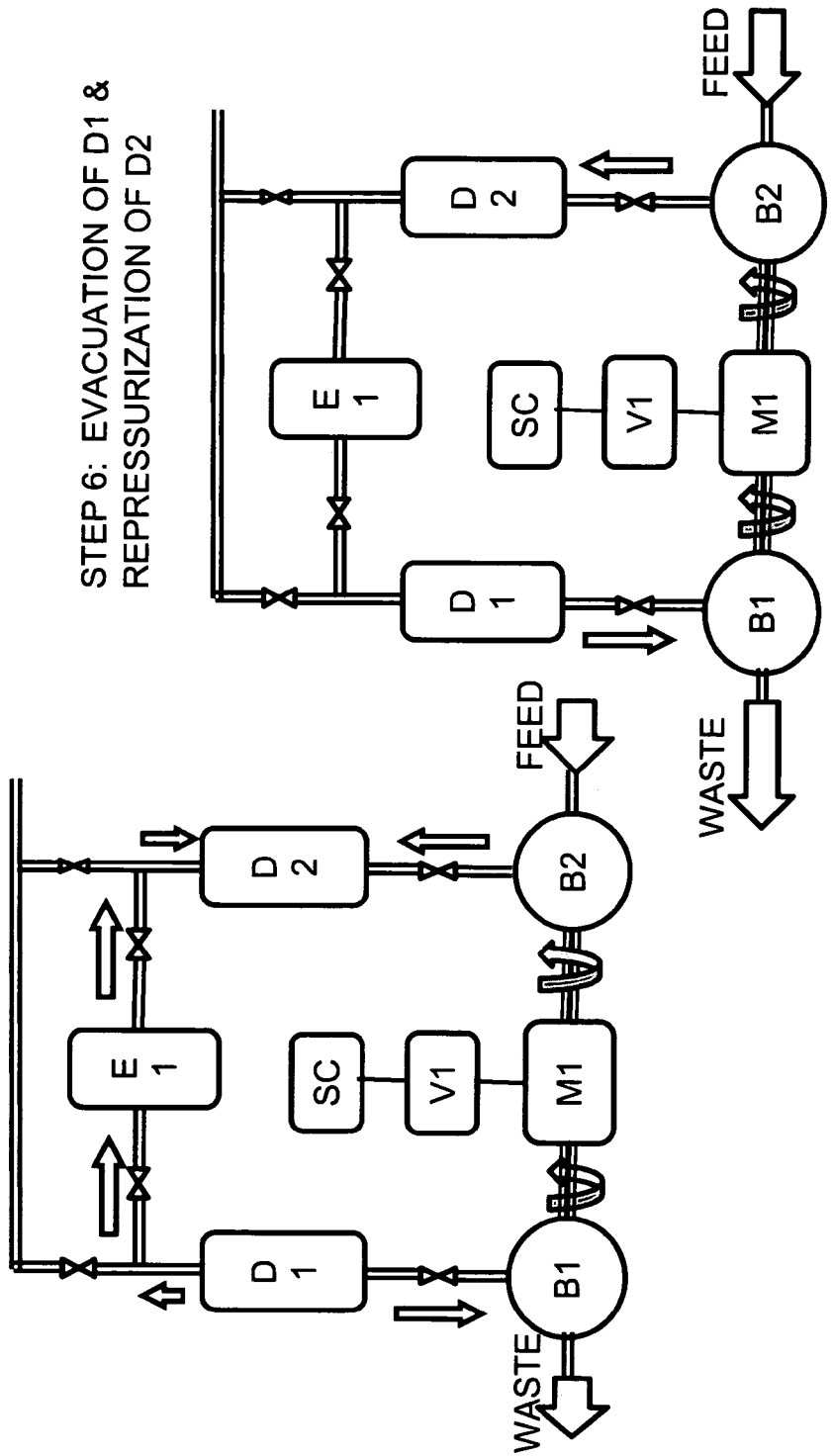

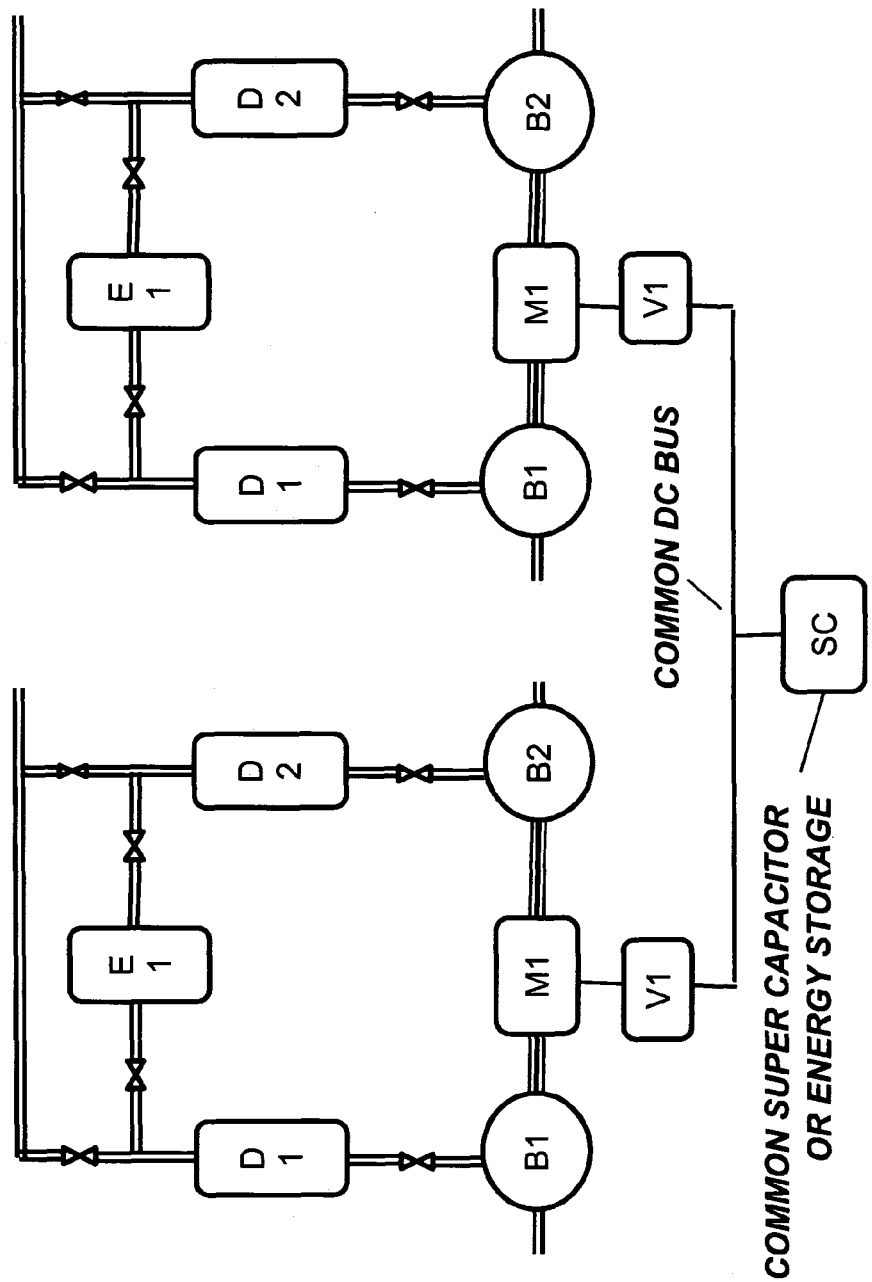

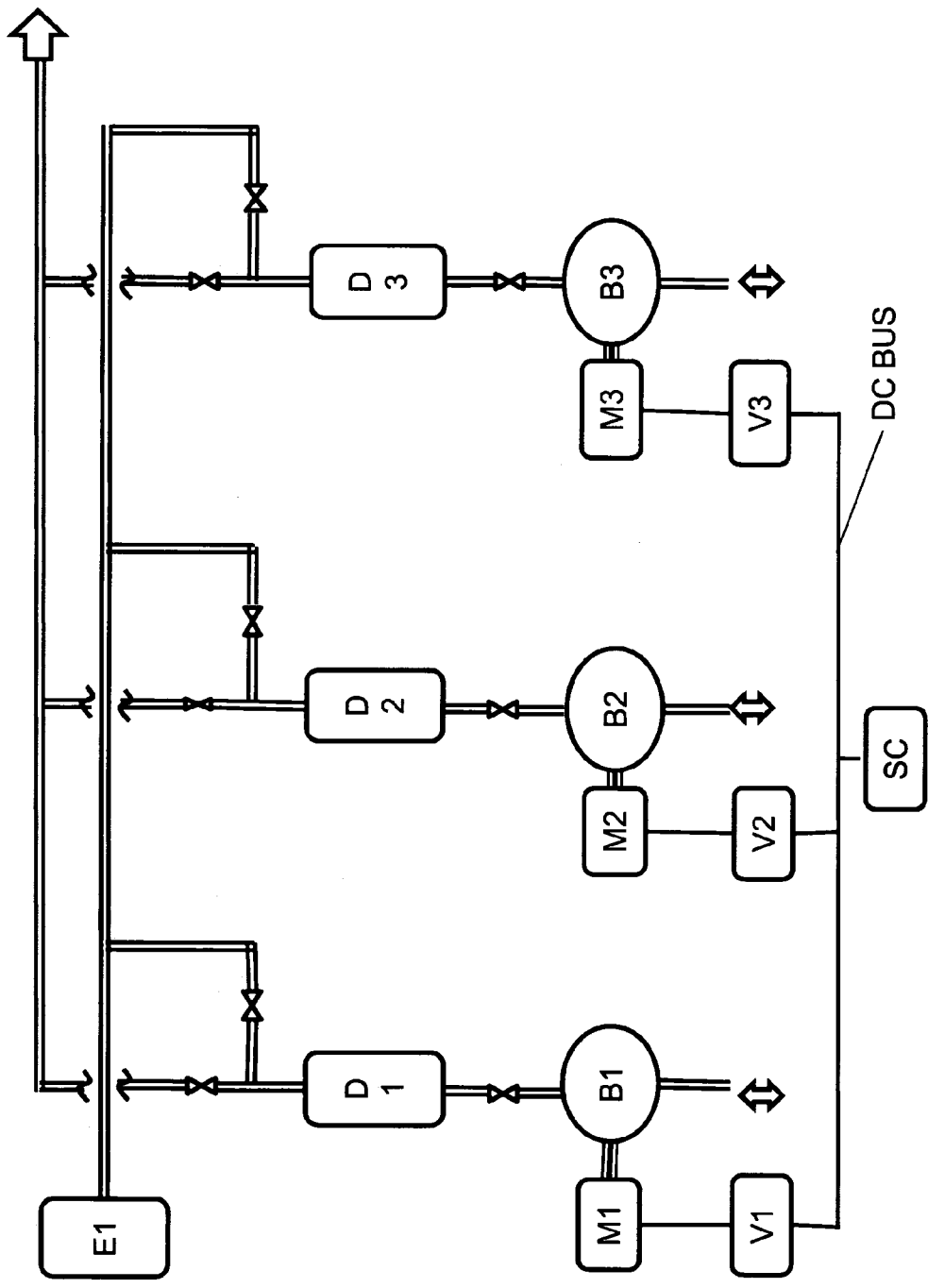
FIG. 6 THREE BED VARIATION OF THE FIG 1 PROCESS

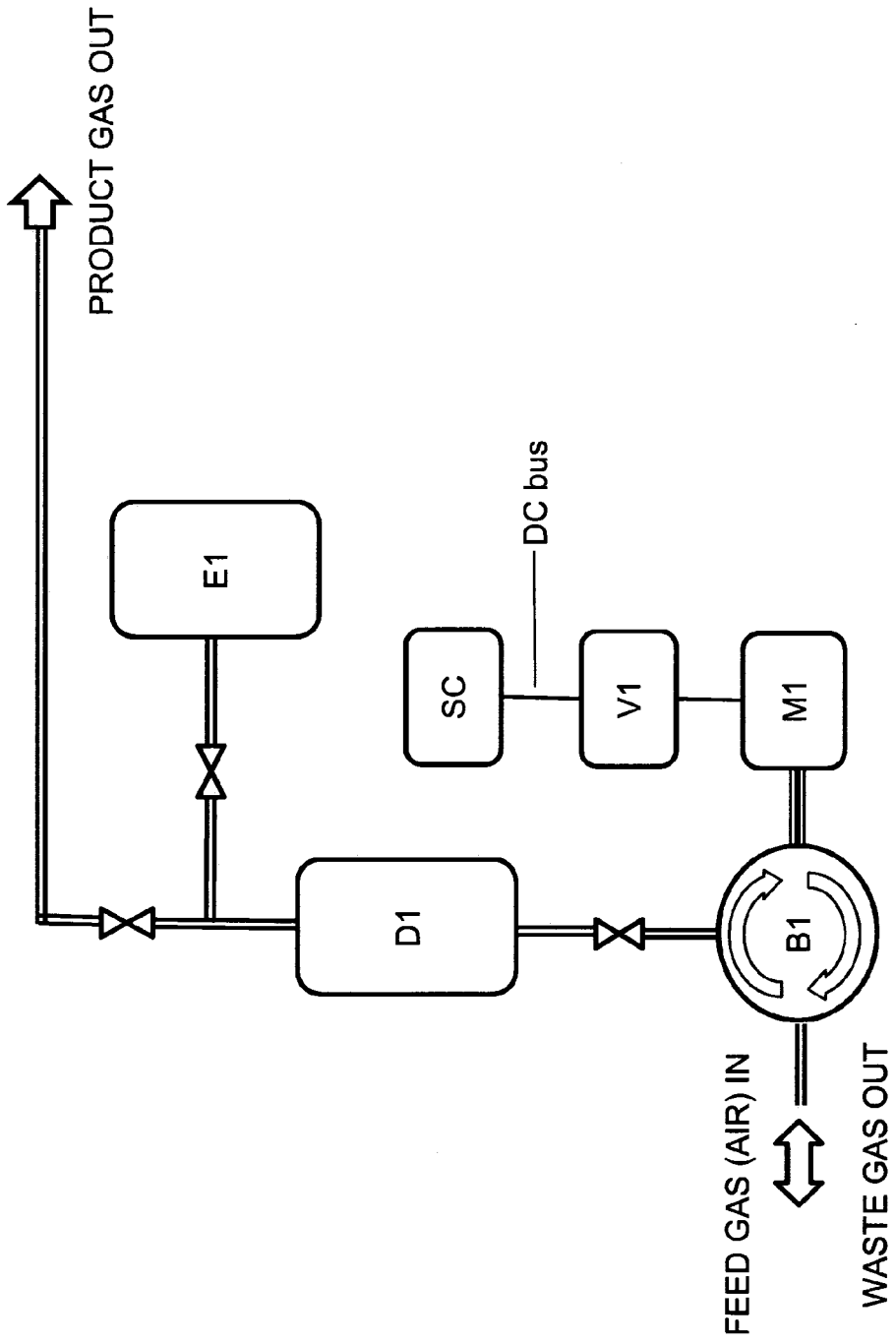
FIG. 7 PROCESS VARIATION USING SINGLE BED AND EQUALIZATION TANK

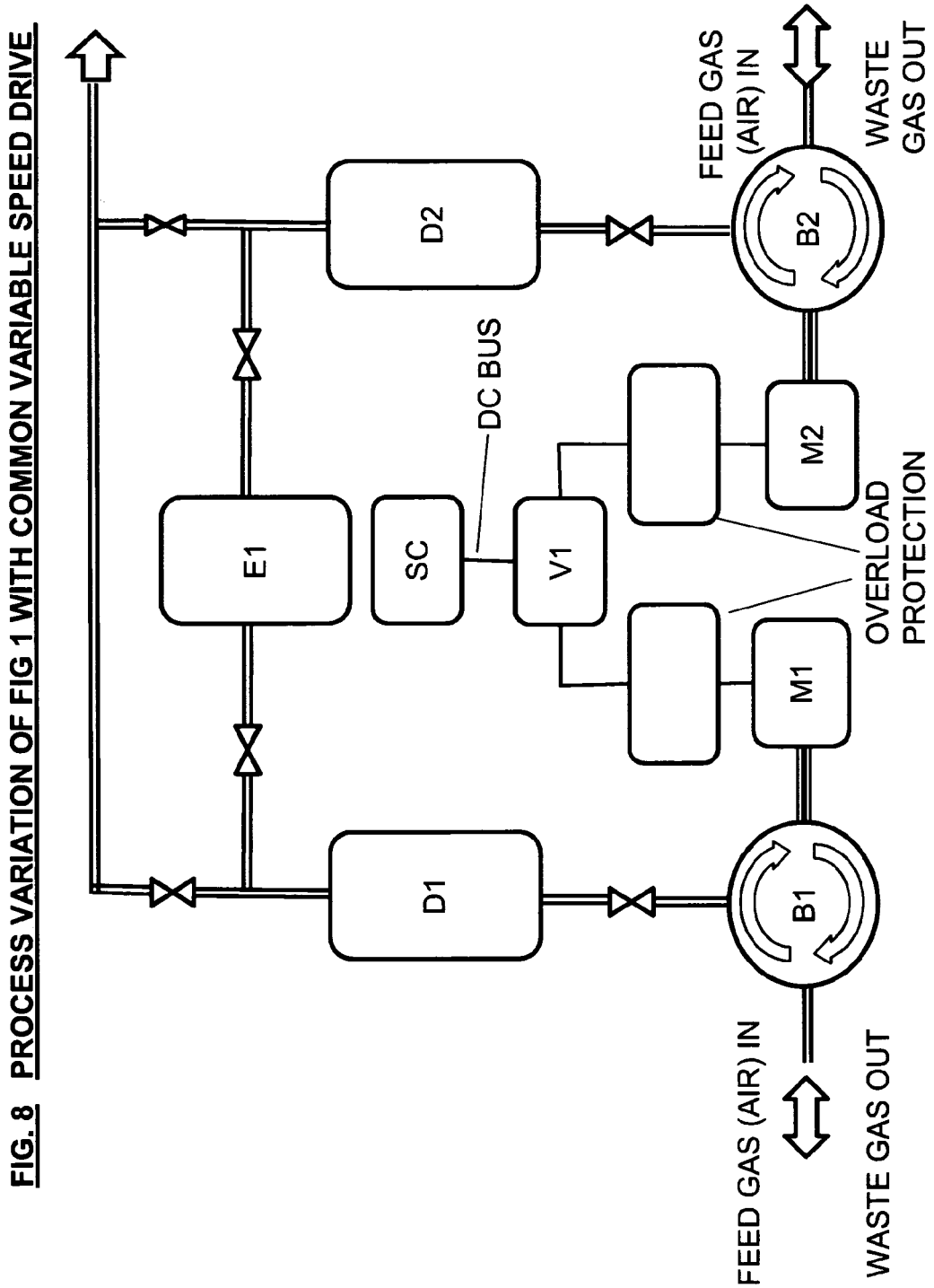
FIG. 8 PROCESS VARIATION OF FIG 1 WITH COMMON VARIABLE SPEED DRIVE

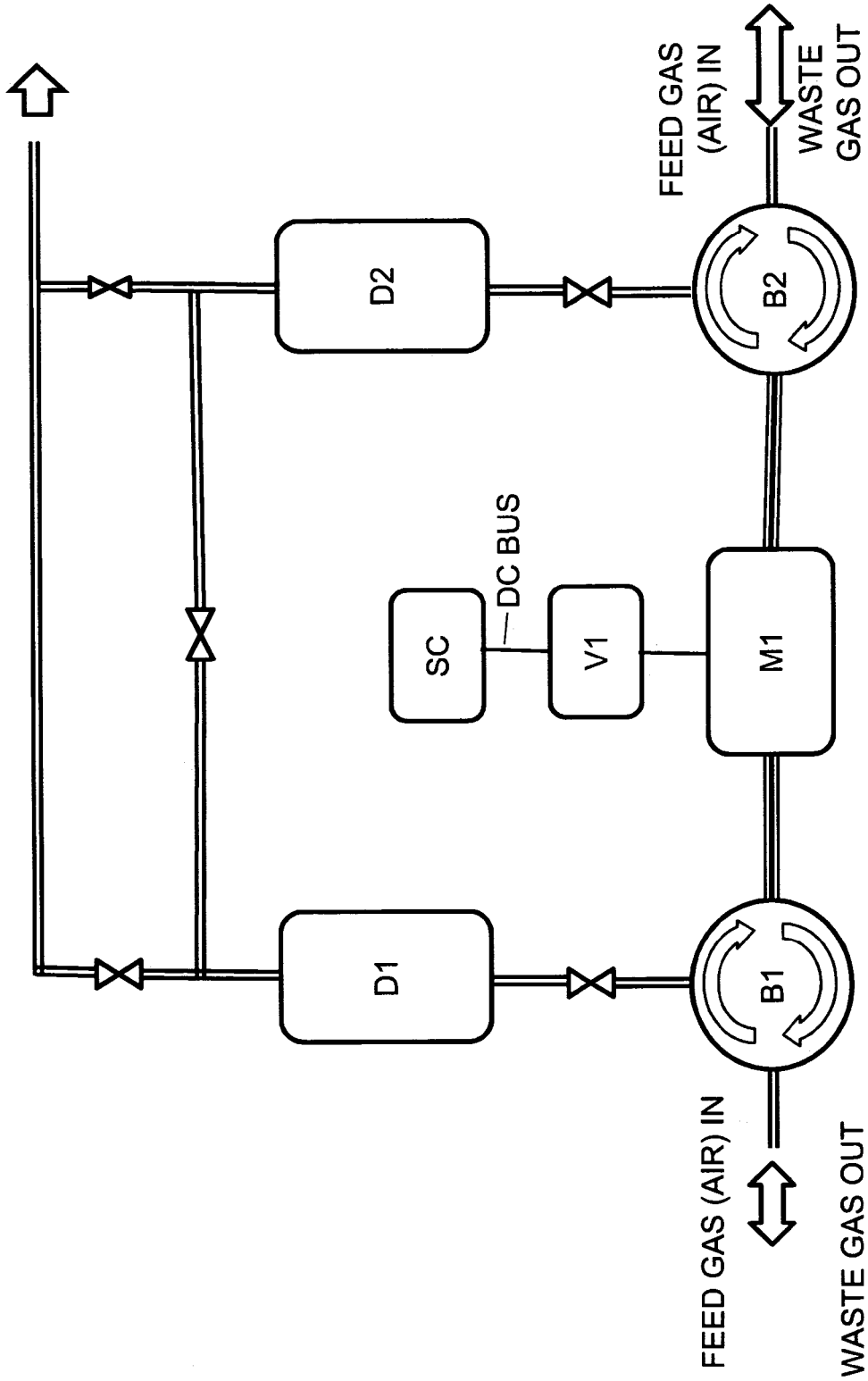
FIG. 9  PROCESS VARIATION OF FIG 2 WITHOUT THE EQUALIZATION TANK

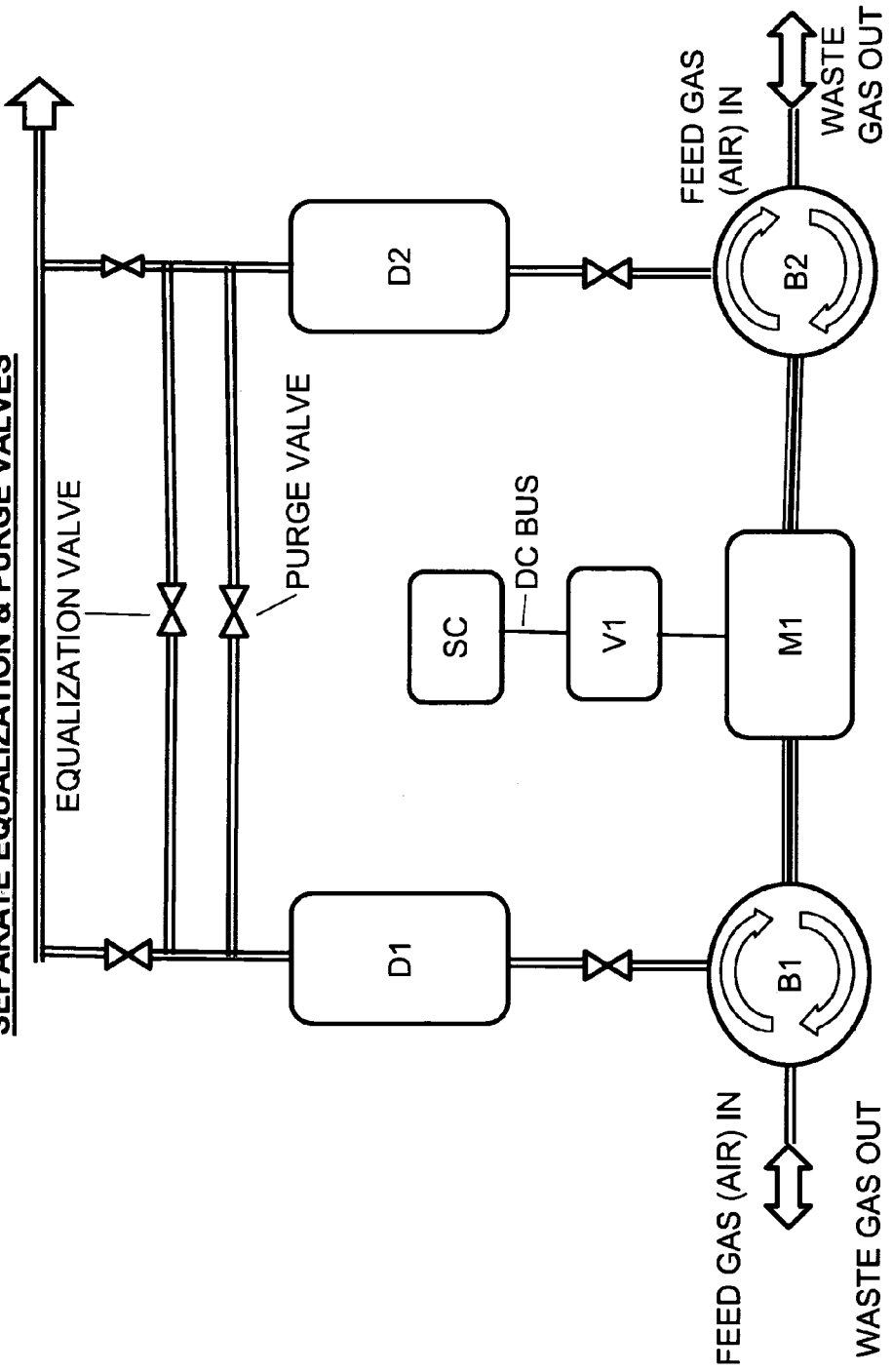
FIG. 10 PROCESS VARIATION OF FIG 9 WITH SEPARATE EQUALIZATION & PURGE VALVES

METHOD TO IMPROVE RECOVERY AND EFFICIENCY OF ADSORPTION PROCESSES USING REVERSIBLE BLOWERS

FIELD OF THE INVENTION

The present invention relates to a process for purifying gases from a mixture of gases, using cyclic vacuum pressure swing adsorption (VPSA) that uses Adsorber bed(s). The Adsorber beds are connected to dedicated reversible blowers, which can be used to pressurize and evacuate the beds at variable speeds in fixed or variable times. The process can been extended to a single adsorber bed or multiple adsorber beds.

BACKGROUND OF THE INVENTION

Cyclic adsorption processes are frequently used to separate the components of a gas mixture, typically using one or more adsorber vessels that are packed with a particulate adsorbent material which adsorbs at least one gaseous component of the gas mixture more strongly than it adsorbs at least one other component of the mixture. The adsorption process comprises repeatedly performing a series of steps, the specific steps of the sequence depending upon the particular cyclic adsorption process being carried out. In any cyclic adsorption process, the adsorber bed has a finite capacity to capture a given gaseous component and therefore the adsorbent requires periodic regeneration to restore its adsorption capacity. The procedure followed for regenerating the adsorbent varies according to the process. In VPSA processes, the adsorbent is at least partially regenerated by creating a vacuum in the adsorber vessel thereby causing adsorbed components to be desorbed from the adsorbent. Also the adsorption step is carried out at a pressure higher than the regeneration step.

A typical VPSA process, such as detailed in U.S. Pat. No. 5,122,164 comprises a series of five basic steps that includes (i) Pressurization of the bed to the required pressure, (ii) Production of the product gas, (iii) Evacuation of the bed, (iv) Purging the bed with product gas under vacuum conditions and (v) Pressure equalization step to minimize vent losses and improve efficiency.

As mentioned above, the regeneration process includes a purge step during which a gas stream that is depleted in the component to be desorbed is passed counter-currently through the adsorber bed thereby reducing the partial pressure of adsorbed component, which in turn causes additional adsorbed component to be desorbed from the adsorbent. The non-adsorbed gas product may be used to purge the adsorber beds since this gas is usually quite depleted in the adsorbed component of the feed gas mixture. It often requires a considerable quantity of purged gas to adequately regenerate the adsorbent. For example, it is not unusual to use half of the non-adsorbed product gas produced during the previous production step to restore the adsorbent to the desired extent.

Many process improvements have been made to this simple cycle design in order to reduce power consumption, improve product recovery and purity, lower capital cost and increase product flow rate. These have included multi-bed processes, single column rapid pressure swing adsorption and more recently piston driven rapid pressure swing adsorption and radial flow rapid pressure swing adsorption. The trend toward shorter cycle times is driven by the desire to design more compact processes with lower capital costs and lower power requirements.

One of the improvements was made in U.S. Pat. No. 5,679,134 which suggested using a single bed with a reversible blower to reduce the complexity of the process. In U.S. Pat. No. 5,906,674 a tank was used to store low purity purge gas to improve the productivity of the process.

Investigation of these prior arts defined significant deficiencies which made them impractical for use in the industry both on small and large scale. The present invention, in distinction from the prior art, provides a safer, more practical and energy efficient process.

SUMMARY OF THE INVENTION

The present invention provides for a method of integrating the single or multiple bed VPSA process with dedicated reversible blower on each bed operating in a typical adsorption cycle. The process may also use a buffer tank to store purge and equalization gas to improve the process efficiency. In the case of two or more bed version, this buffer tank allows for efficient half production use during maintenance downtime of a blower. The process also provides a means to store and utilize electrical energy generated during bed transition to improve energy efficiency. As such, the process can be used to separate any gas mixture and specifically but not limited to oxygen gas from air.

BRIEF DESCRIPTION OF THE DRAWINGS

FIG. 1 is a schematic representation of the variation of the process with two separate motors, two reversible blowers and two adsorber beds.

FIG. 2 is a schematic representation of the process with a single motor, two reversible blowers and two adsorber beds.

FIGS. 3A to 3E provide a description of cycle sequence and machine operation for the process as represented in FIG. 1.

FIGS. 4A to 4E provide a description of cycle sequence and machine operation for the process as represented in FIG. 2.

FIG. 5 provides a description of the method by which two or more production units using the claimed process may utilize common DC bus.

FIG. 6 provides a schematic for a three bed version of the process

FIG. 7 provides a schematic for a single bed version of the process.

FIG. 8 provides a schematic for an alternative scheme to FIG. 1 where a common variable speed drive was used to control two motors.

FIG. 9 provides a typical schematic of a process without an equalization tank.

FIG. 10 provides a typical schematic of a process with separate purge and equalization valves.

DETAILED DESCRIPTION OF THE INVENTION

The present invention provides for an improved VPSA (vacuum pressure swing adsorption) process for separating a gas from a mixture of gases in single or multiple adsorption beds wherein each bed undergoes a process cycle comprising the steps of (1) evacuating a bed using a blower being used as vacuum pump; (2) purging the bed using the vacuum pump and the product from the other bed; (3) feeding the mixture of gases to the bed with the blower running in opposite direction until a set pressure is reached; (4) producing purified product gas from the bed while the feed blower is still on line; and (5) pressure equalizing the two bed while the feed blower is stopped subsequently reversed in direction.

The present inventors anticipate two beds in the process as shown in FIGS. 1 & 2, three beds as shown in FIG. 6 and a single bed as shown in FIG. 7. There will be a reversible blower attached to each of the beds. The reversible blowers are connected to either a common or individual motors in two different variations of this invention shown in FIGS. 1 & 2. The motors are connected to a variable speed drive or controller to vary speed or reverse the direction of rotation. The DC buses of all the variable speed drives are connected to each other and to a super capacitor for storing DC energy during stopping and reversing of the motor. The potential energy in form of pressure in the bed at higher pressure and vacuum in the bed at lower pressure is conserved by the technique outlined in the process. During switch over and reversing of the blower motor (s) the electrical energy is generated as the direct current (DC) in the variable speed drive which must be either dissipated as heat or wasted. The present inventors envisage this energy to be temporarily stored in a super capacitor and passed on to the other electrical consumers using variable speed drives directly thereby improving the energy efficiency of the process. The super capacitor in this process may be substituted with other forms of DC electrical storages such as rechargeable batteries.

The process includes an optional product buffer tank which may be beneficial to achieve better mixing and more uniform product purity and pressure.

Figure 3E:
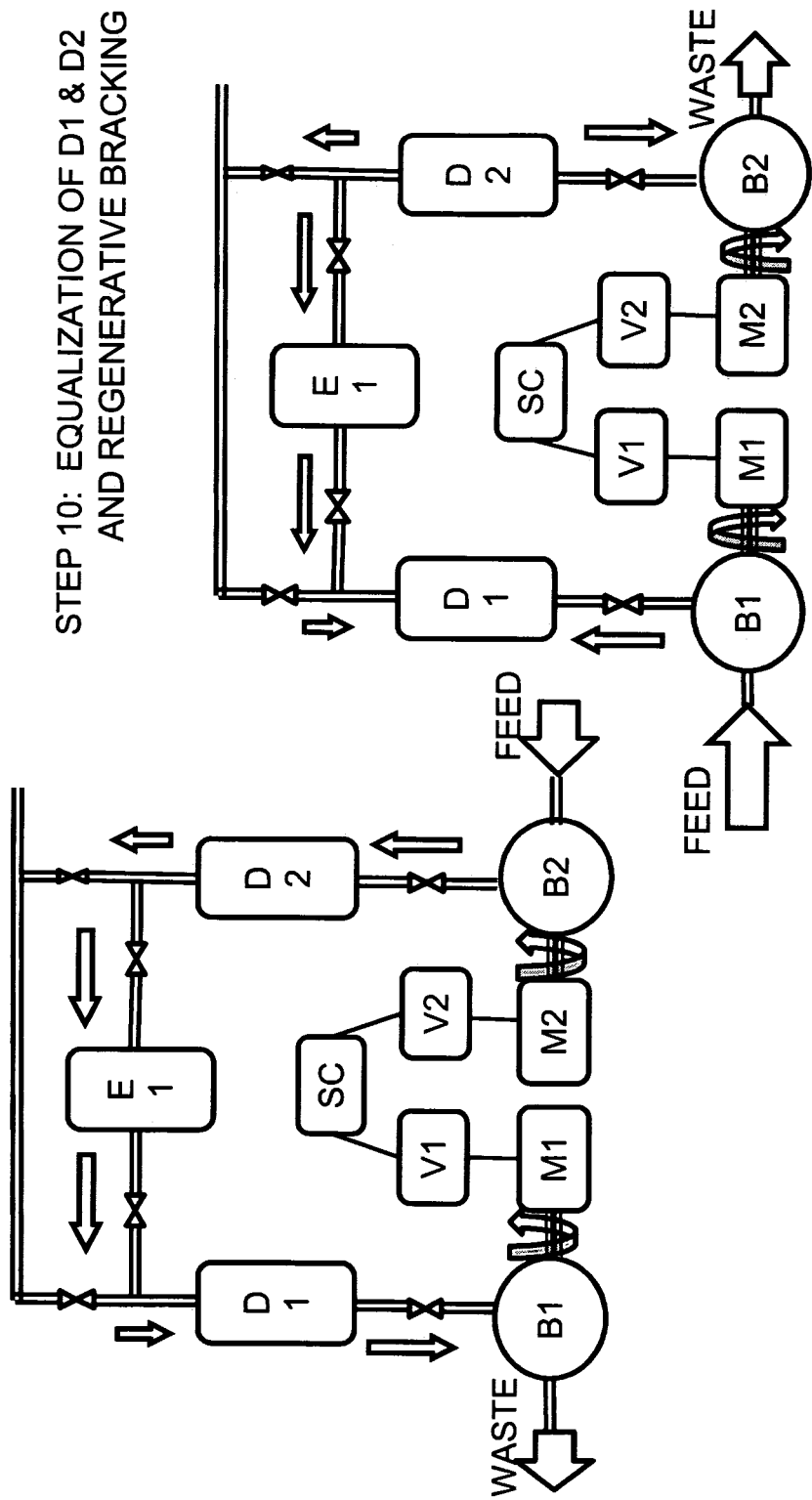

In the dual motor version of the process as detailed in FIG. 1, the present inventors have connected the variable speed drives (VSD) "V1" and "V2" to each other through a DC bus and to the super capacitor "SC" to store, transfer and reuse the wasted regenerated energy. The "V1" and "V2" are used to control the speeds of motors "M1" and "M2", which in turn are used to run Blowers "B1" and "B2". The "V1" and "V2" are used to reverse the direction of rotation of "B1" and "B2" during different parts of the cycle as detailed in FIG. 3A to FIG. 3E.

Figure 4A:
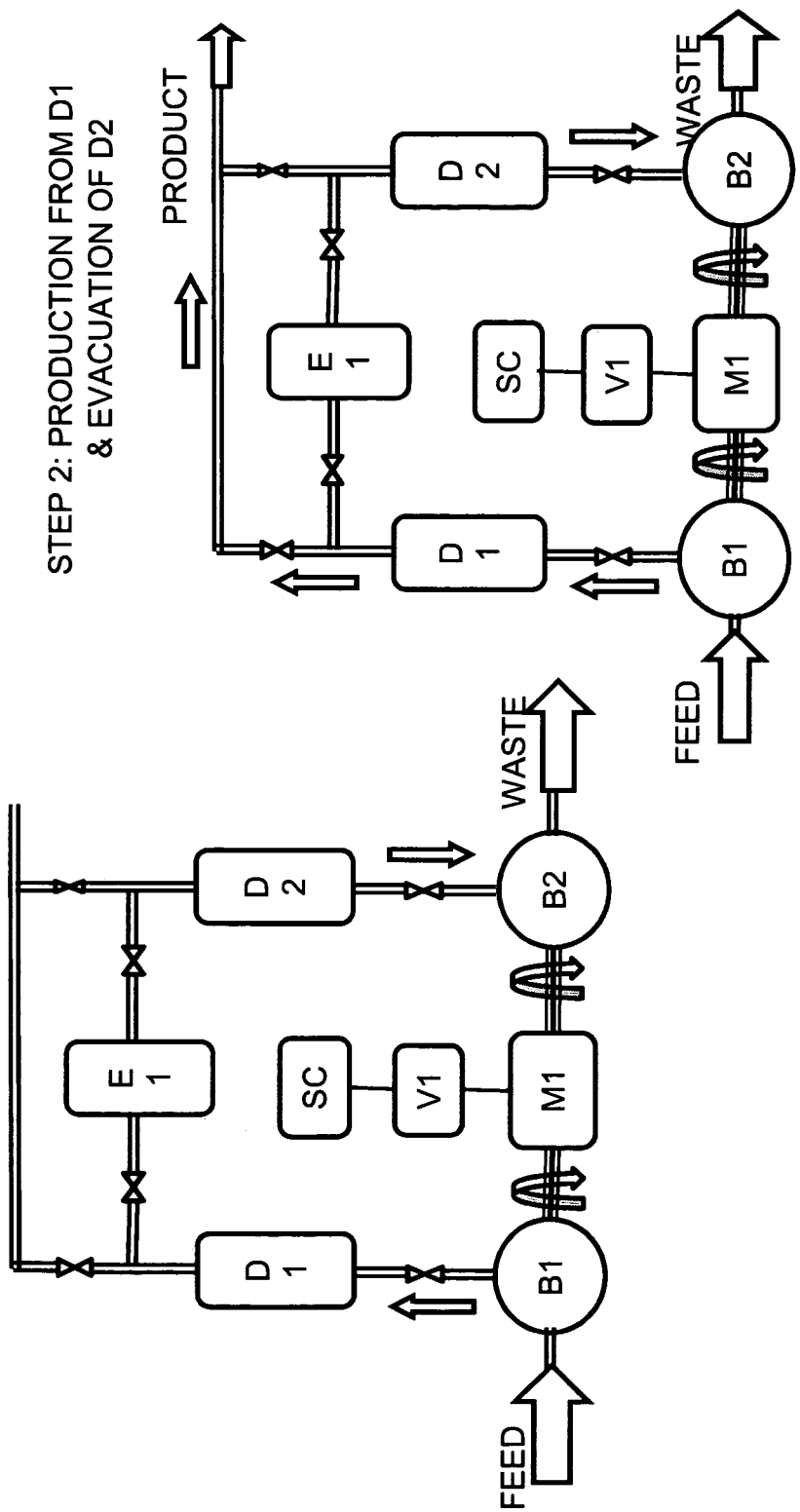
Figure 4D:
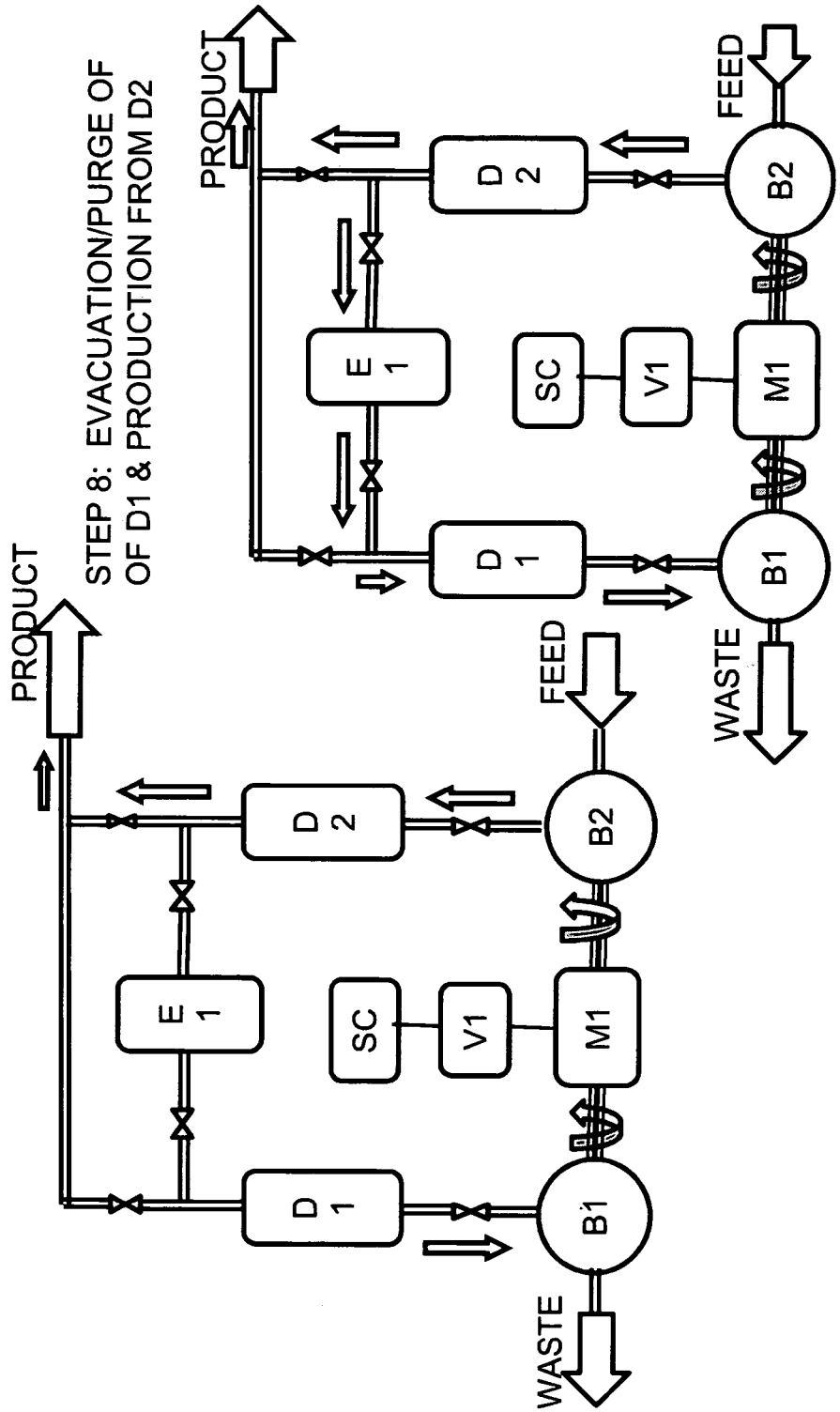
Figure 4E:
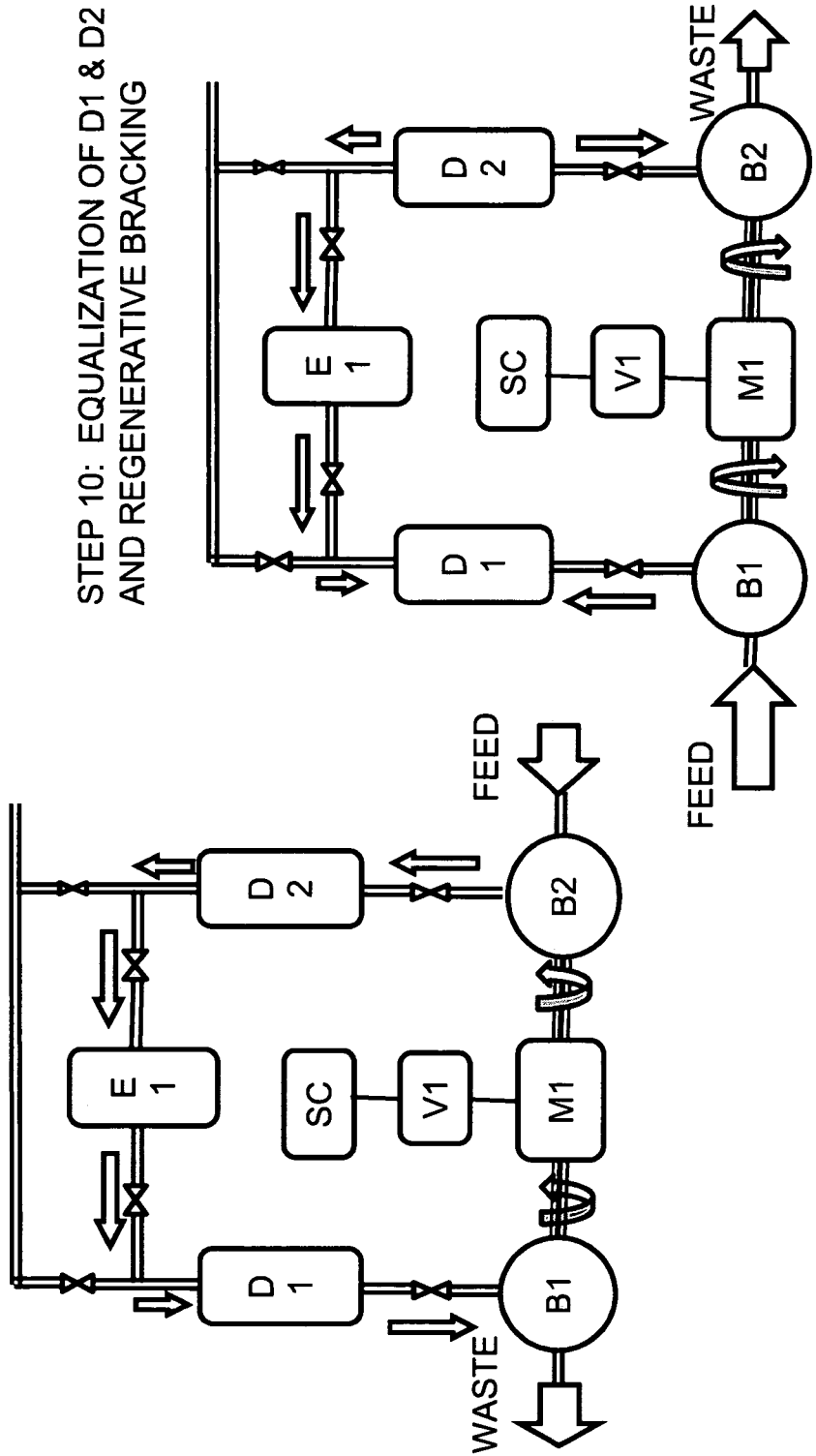

In the single motor version of the process as detailed in FIG. 2, the present inventors have connected the VSD "V1" to the super capacitor "SC" in the same way as in the above dual motor version. The blowers "B1" and "B2" are oriented in a method such that one direction of rotation of "M1" causes "B1" to act as blower and "B2" to act as vacuum pump. The "V1" reverses the direction of rotation and the process cycle works in a similar fashion as the dual motor version as detailed in FIG. 4A to FIG. 4E.

The process described in FIG. 3A to FIG. 3E is similar to FIG. 4A to FIG. 4E except for the two motors in previous version and a single motor in latter. The process description below therefore will apply to all versions of the process.

The Blower "B1" gets the feed gas and rejects waste through line "L1". In the present inventions' embodiment this feed gas is Air and waste is Nitrogen rich gas (N2). The feed gas from "B1" is feed to the adsorber bed "D1" through line "L3" and valve "1". The valve "1" and valve "2" have been provided to protect the adsorber bed during down time, enable the removal of either "B1" or "B2" respectively and also to enable either "D1" or "D2" respectively to act as extra product storage during maintenance. The purified product gas which is oxygen (O2) in the present embodiment is obtained from the product side of "D1". The product gas is withdrawn from the process through line "L5", product valve "5" and line "L9". During purge and equalization steps the product gas will be diverted to the equalization tank "E1" through valve "3" and line "L7". Also during the regeneration part of the cycle the purge gas will be received from tank "E1" through valve "3" and "L7" from the bed "D2"

Similarly, the Blower "B2" gets the feed gas and rejects waste through line "L2". The feed gas from "B2" is feed to the adsorber bed "D2" through line "L4" and valve "2". The product gas is withdrawn from the process through line "L6", product valve "6" and line "L9". During purge and equalization steps the product gas will be diverted to the equalization tank "E1" through valve "4" and line "L8". Also during the regeneration part of the cycle the purge gas will be received from tank "E1" through valve "4" and "L8" from the bed "D1".

In another variation of process described in FIG. 9 it is possible to eliminate the equalization tank "E1" and one of the valves "4" or "3" thereby losing some process efficiency but simplifying the process for smaller production units.

In another variation of the process described in FIG. 2 only (with single motor version) the process cycle can be operated asymmetrically in such a way the gas from the adsorber bed "D1" during step 4 & 5 can be stored into tank "E1" and provided to the receiving bed "D2" after a period of typically 4-6 seconds. The same sequence is applied to the gas transfer from D2 to D1 during step 9 & 10. This enables the mechanical energy to be directly transferred from "B1" to "B2" vice versa. The adsorber beds "D1" and "O2" and the blowers "B1" and "B2" may be sized differently in such a case and either of "D1" or "D2" may make more product gas.

The present invention provides that the claimed process can be operated in a nominal full cycle timing of 20 seconds to 300 seconds, most preferably between 30 seconds to 120 seconds.

The present invention requires the process to be operated at a typical maximum feed pressure of between 12 psia to 30 psia, most preferably between 18 psia to 23 psia. The maximum pressure in the process is preset with a controller and can be controlled either by changing the speed of the blowers or the cycle step times.

The present invention requires the process to be operated at a typical minimum evacuation pressure of between 10 psia to 3 psia, most preferably between 8 psia to 5 psia. The minimum pressure in the process is also preset with a controller and can be controlled either by changing the speed of the blowers or the cycle step times.

The present invention also provides for two or more production units using all claimed versions of the process operating asynchronously and can have common DC bus and super capacitor to reuse the regenerative energy as obtained in the process. This is described by FIG. 5.

The present invention as described by FIG. 3A-3E can also be used as a three bed process with or without common equalization tank. This is detailed in FIG. 6. In the case of three bed process the cycle each bed operates at, is offset by one-third of a full adsorption cycle. This offset allows for regeneration energy to be consumed by the other blowers. The flow of product gas in such a process will be more continuous than a single or dual bed process.

The present invention can also be used as a single bed process with an equalization tank with similar energy efficiency using variable speed drives and super capacitor. This is detailed in FIG. 7.

The present invention also provides a method to operate the process with two motors as in FIG. 1, with a common variable speed drive. This can be accomplished by using overload protection on each motor and reversing the current phases in the two motors. This is detailed in FIG. 8.

The present invention also provides for a variation in which instead of common equalization/purge valve the process can be operated with independent purge and equalization valves. This is detailed in FIG. 10.

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

Having thus described the invention, what we claim is:

1. An apparatus for producing oxygen comprising:
   two adsorber beds (D1,D2) each connected to at least one reversible blower (B1,B2) through isolation valves (1,2), an equalization line which has two valves (3,4) along with a buffer tank (E1), and two product valves (5,6); and
   a separate motor (M1,M2) to drive each blower, powered by variable frequency drives (V1,V2) and connected to a super capacitor (SC);
   wherein a control method actuates rotating machinery associated with the at least one blower sequentially in clockwise and anticlockwise directions to supply air to the inlet of one bed while regenerating the other bed by removing adsorbed nitrogen using a vacuum.

2. The apparatus of claim 1, further comprising an additional purge line parallel to the equalization line.

3. The apparatus of claim 1, further comprising a feed isolation valve on each bed to prevent moisture ingress and to allow ease of maintenance.

4. The apparatus of claim 1, further comprising two or more layers of different adsorbent material in each adsorber bed.

5. A process for producing oxygen comprising:
   providing two adsorber beds (D1,D2) each connected to at least one reversible blower (B1,B2) through isolation valves (1,2), an equalization line which has two valves (3,4) along with a buffer tank (E1), and two product valves (5,6);
   providing a separate motor (M1,M2) to drive each blower, powered by variable frequency drives (V1,V2) and connected to a super capacitor (SC);
   executing a control method that actuates rotating machinery associated with the at least one blower sequentially in clockwise and anticlockwise directions to supply air to the inlet of one bed while regenerating the other bed by removing adsorbed nitrogen using a vacuum.

6. The process of claim 5, further comprising providing an additional purge line parallel to the equalization line.

7. The process of claim 5, further comprising providing a feed isolation valve on each bed to prevent moisture ingress and to allow ease of maintenance.

8. The process of claim 5, further comprising of two or more layers of different adsorbent material in each adsorber bed.

9. The process of claim 5, further comprising maintaining a preset maximum pressure and preset minimum pressure by varying machine speeds and operating at fixed cycle step times.

10. The process of claim 5, further comprising maintaining a preset maximum pressure and preset minimum pressure by varying cycle step times at constant machine speeds.

* * * * *